United States Patent
Bradbury et al.

(10) Patent No.: US 11,780,184 B2
(45) Date of Patent: Oct. 10, 2023

(54) METHODS AND APPARATUS FOR SECURING AN AUTOCLAVE BAG TO A COMPOSITE FIXTURE

(71) Applicant: General Electric Company, Schenectady, NY (US)

(72) Inventors: Douglas George Bradbury, Evendale, OH (US); Daniel P. Ivkovich, Evendale, OH (US); Nolan Leander Cousineau, Evendale, OH (US)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 17/245,524

(22) Filed: Apr. 30, 2021

(65) Prior Publication Data
US 2022/0347946 A1 Nov. 3, 2022

(51) Int. Cl.
*B29C 70/54* (2006.01)
*B29C 70/34* (2006.01)
*B29L 31/00* (2006.01)

(52) U.S. Cl.
CPC .......... *B29C 70/544* (2021.05); *B29C 70/342* (2013.01); *B29L 2031/7504* (2013.01); *F23R 2900/00018* (2013.01)

(58) Field of Classification Search
CPC ... B29C 70/544; B29C 33/50; B29C 43/3642; B29C 43/10
See application file for complete search history.

(56) References Cited

U.S. PATENT DOCUMENTS

| 2,459,400 | A | | 1/1949 | Williams | |
|---|---|---|---|---|---|
| 3,194,705 | A | * | 7/1965 | Caplan | F16L 11/112 264/528 |
| 3,258,384 | A | * | 6/1966 | Scott | B29C 33/505 425/77 |
| 3,401,791 | A | | 9/1968 | Scott et al. | |
| 4,522,434 | A | * | 6/1985 | Webb | F16L 17/04 285/368 |
| 6,071,460 | A | * | 6/2000 | Renaudin | B29C 70/446 425/389 |
| 6,318,551 | B1 | | 11/2001 | Calvert et al. | |
| 6,609,879 | B2 | | 8/2003 | Griggs | |
| 6,789,691 | B2 | | 9/2004 | Martin et al. | |
| 6,983,844 | B2 | | 1/2006 | O'Kane et al. | |
| 7,017,751 | B2 | | 3/2006 | Clark et al. | |
| 7,674,418 | B2 | * | 3/2010 | Matsumoto | B29C 70/446 425/389 |
| 9,027,351 | B2 | | 5/2015 | Baten | |
| 9,724,870 | B2 | * | 8/2017 | Morrow | B29C 33/48 |
| 2009/0051069 | A1 | * | 2/2009 | Hanson | B29C 33/52 425/175 |

(Continued)

*Primary Examiner* — Matthew J Daniels
(74) *Attorney, Agent, or Firm* — HANLEY, FLIGHT & ZIMMERMAN, LLC (57) ABSTRACT

Methods and apparatus for securing an autoclave bag to a composite fixture are disclosed. An example apparatus includes a flange sealing device including a forward flange at a first end and an aft flange at a second end, and a composite fixture including a forward groove to locate and seal with the forward flange of the flange sealing device to affix an autoclave bag, an aft groove to locate and seal with the aft flange of the flange sealing device to affix the autoclave bag, and an aft locating ring to position the autoclave bag.

10 Claims, 9 Drawing Sheets

(56) References Cited

U.S. PATENT DOCUMENTS

2012/0118487 A1* 5/2012 Havens ................ B29C 70/446
                                                156/165
2018/0222666 A1   8/2018 Senkiw et al.
2020/0094491 A1*  3/2020 Shewchuk ............ B29C 70/342

\* cited by examiner

METHODS AND APPARATUS FOR SECURING AN AUTOCLAVE BAG TO A COMPOSITE FIXTURE

FIELD OF THE DISCLOSURE

This disclosure relates generally to autoclave bags and, more particularly, to securing an autoclave bag to a composite fixture.

BACKGROUND

The manufacture of composite structures employs the use of composite molds or tools in conjunction with autoclave bags. A composite material layup rests on a surface of a composite mold or tool and an autoclave bag is secured over the composite layup. Compressive forces in the form of a vacuum seal are applied to the system in order to pressurize and debulk the material or remove air trapped between layers of the composite material layup and excess resin or solvent. The debulked material is then placed into an autoclave to cure the composite material to ultimately reveal a composite structure for use in various applications.

BRIEF SUMMARY

The examples disclosed herein present an apparatus including a flange sealing device including a forward flange at a first end and an aft flange at a second end. The example apparatus further includes a composite fixture including a forward groove to locate and seal with the forward flange of the flange sealing device to affix an autoclave bag, an aft groove to locate and seal with the aft flange of the flange sealing device to affix the autoclave bag, and an aft locating ring to position the autoclave bag.

Other examples disclosed herein present an apparatus including a flange sealing device including a forward flange at a first end, the forward flange to position and seal a first end of an autoclave bag with respect to a fixture and an aft flange opposite the forward flange at a second end, the aft flange to position and seal a second end of the autoclave bag with respect to the fixture.

Other examples disclosed herein present an apparatus including means for facilitating a vacuum seal of an autoclave bag in both axial and radial directions across the circumference of a composite fixture means for locating and sealing a flange sealing device to an autoclave bag.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Composite materials, otherwise known as composites, are fabricated from the consolidation of two or more constituent materials to form a material or a composite structure with chemical and/or physical properties unique to those of the individual elements. One method of manufacturing such a composite material or structure involves layering multiple plies of uncured composite material to form a composite layup into a tool or composite fixture. Examples of composite materials include ceramic matrix composites or polymeric matrix composites. The tool or fixture serves as a mold to shape the final composite structure to be produced. These fixtures can come in a variety of sizes and shapes depending on the ultimate desired structure or product. As plies (e.g., a film, sheet, or other layer) of composite material are layered together, vacuum pressure is applied to debulk the material by compressing the plies to remove excess resin, solvent, or air in between the individual plies and to help ensure uniform consolidation throughout the material. The process of laying and debulking is repeated depending on a desired thickness of the final composite material. Thus, the thickness of the composite layup determines the thickness of the final composite structure. This thickness can vary based on a configuration or intended application of the final composite structure, for example. The final debulked composite layup is then placed into an autoclave for curing of the material, after which the cured material is removed from the fixture to reveal a composite structure that is ready for use or further processing.

During the debulking process, an autoclave bag is placed over the composite layup and secured to the tool or fixture. This autoclave bag allows for the applied vacuum pressure to uniformly compress the entire layup. Currently, manual bagging techniques are used to secure a manual or preformed autoclave bag to a composite fixture for use in the vacuum and autoclave. In one example of this manual technique, multiple pieces of tape are needed around the whole outside perimeter of a composite fixture to create seal connection points for an adequate seal of the autoclave bag to the fixture. However, these manual strategies are labor intensive, requiring more than one individual to complete, inaccurate, and are grow increasingly time-consuming as fixture sizes increase in size. The current manual bagging methods also introduce the risk of vacuum leakage during the debulking process, which results in inconsistencies in the composite material. Vacuum leakage further causes air and/or resin in between composite plies to remain between the layers, which, when not removed prior to curing, can result in structure weakening, damage to or reduction in the quality of the final composite structure, or render a structure entirely unusable.

These current techniques pose several shortcomings to composite structure fabrication and provide various opportunities for improvement and solution. The examples disclosed herein address shortcomings of prior solutions by providing a removable and reusable flange sealing device that can be used to secure an autoclave bag to a composite fixture and which can reduce vacuum leakage during composite layup consolidation without the use of tape. The examples described herein further provide a solution to reduce the number of individuals and/or time required to secure an autoclave bag to a composite fixture.

Figure 1:
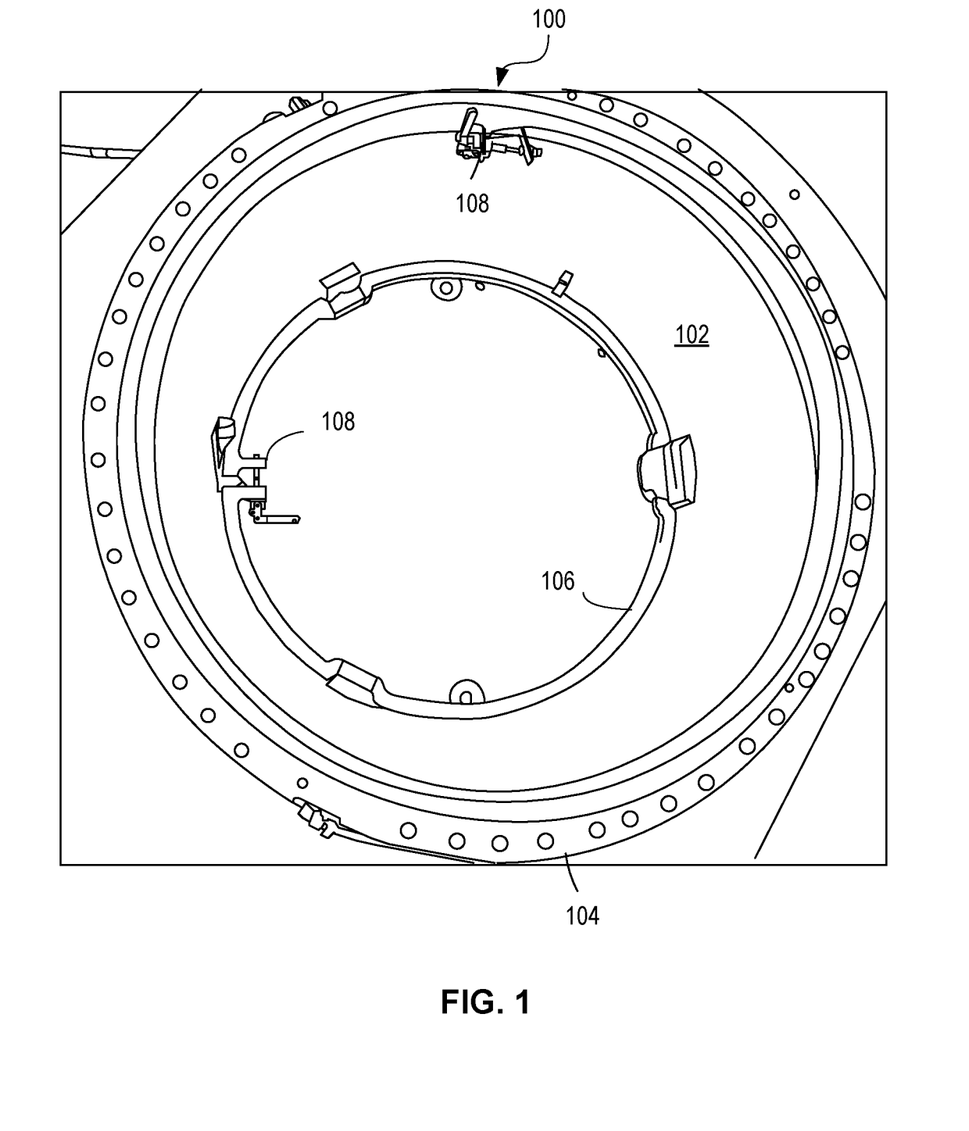
FIG. 1 is a top perspective view of an example composite fixture for autoclaving.

FIG. 1 shows a top perspective view of an example composite fixture 100 used to accept one or more plies (also referred to as layers or sheets) of composite material. In the example of FIG. 1, the plies of composite material to be placed on the interior surface 102 of the example composite fixture 100. The example composite fixture 100 can be cylindrical in shape or can have alternative implementation(s) (prismatic) with an open forward (top) edge 104 and/or an aft (bottom) edge 106 to form a composite structure of analogous shape. As such, the example composite fixture 100 can form a means to accept layers of composite material for pressurizing and autoclaving to output a composite structure. The example composite fixture 100 can also be partitioned into two semi-circular halves or more than two sections which are secured together for placement in the vacuum and autoclave. The example composite fixture 100 can further include mechanisms (e.g., a threaded adjuster(s), a bolt fastener(s) or clip(s)) for affixing 108 both semi-circular halves or the multitude of sections of the fixture together.

Figure 2A:
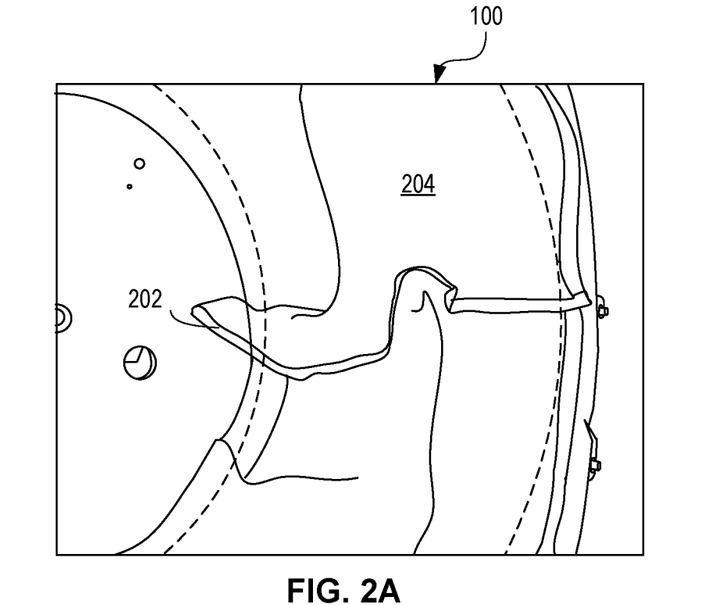
FIG. 2A is a front, left perspective view of a portion of the example composite fixture of FIG. 1.

FIG. 2A illustrates a front, left perspective view of a portion of the example composite fixture 100 to illustrate an example manual bagging technique by placement of a manual autoclave bag or a preform autoclave bag 202 over a composite material layup 204 inside of the example composite fixture 100. The example autoclave bag 202 can be reusable after one or more uses in a vacuum environment and/or an autoclave environment or can be disposable. In some examples, the autoclave bag 202 can withstand a pressurizing environment of a vacuum and/or an autoclaving environment. The example autoclave bag 202 can also be elastomeric. The example autoclave bag 202 can be a reusable silicone bag compatible to form an outer liner and/or an inner liner of a composite part, such as a part for a GE9x engine, other engine, etc. The example autoclave bag 202 transfers vacuum pressure applied along an exposed surface of the autoclave bag to the composite material layup 204 coupled to the example composite fixture 100, which is disposed underneath the autoclave bag, opposite to the exposed surface to which the vacuum is applied.

Figure 2B:
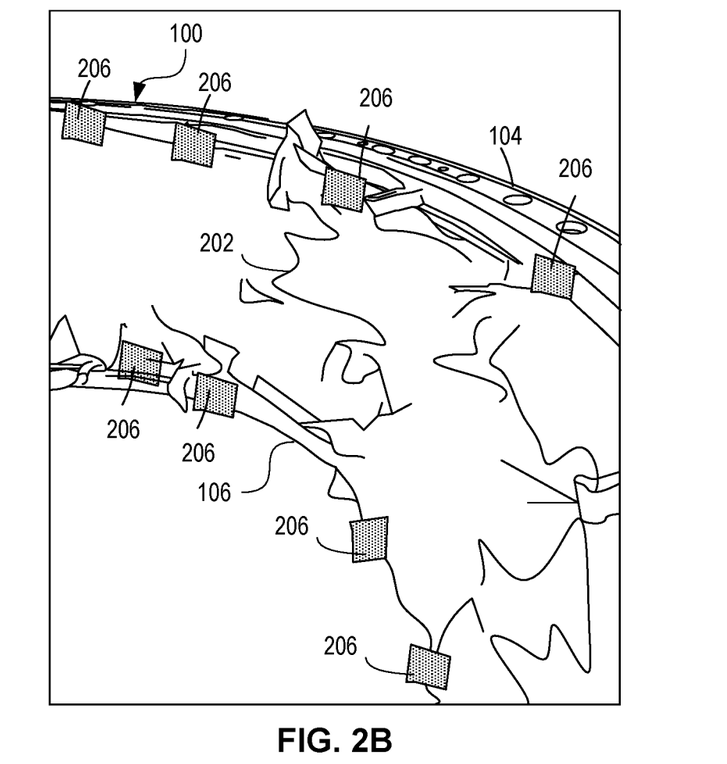
FIG. 2B is a top, left perspective view of a portion of the example composite fixture of FIG. 2A showing an autoclave bag manually taped in position by a user.

FIG. 2B further illustrates a top, left perspective view of a portion of the same example composite fixture 100 as FIG. 2A with applied pieces of tape 206 to couple the autoclave bag 202 along the circumference of a forward edge 104 of the example composite fixture 100 and along the circumference of an aft edge 106 of the example composite fixture 100. FIGS. 2A and 2B demonstrate that wrinkles or creases can form when the applied autoclave bag 202 is placed inside of and/or taped to the example composite fixture 100.

Figure 2C:
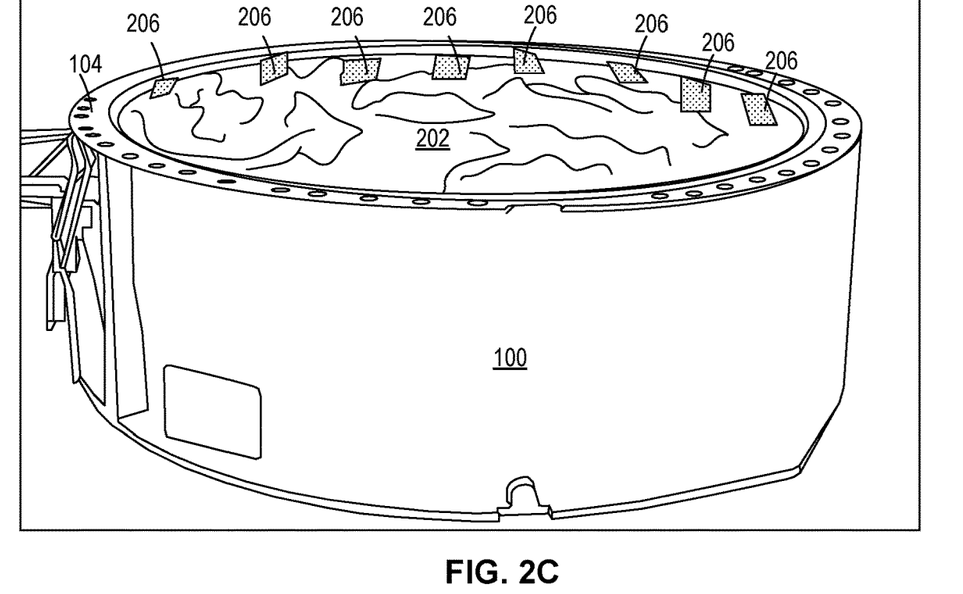
FIG. 2C is a top, left perspective exterior view of the example composite fixture of FIGS. 2A-2B showing an autoclave bag manually secured by a user to the example composite fixture with tape.
Figure 2D:
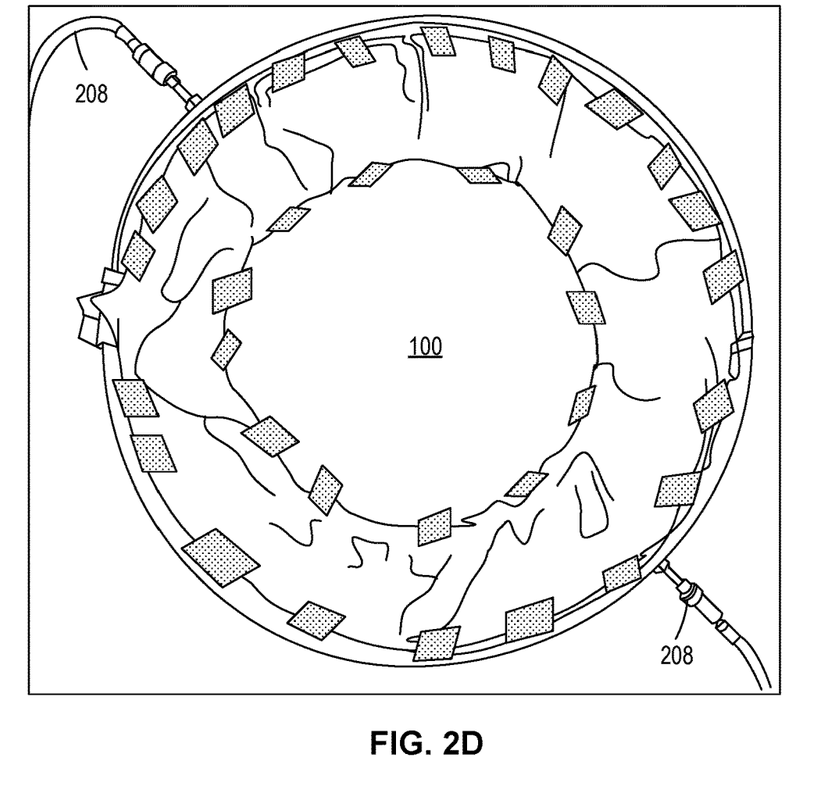
FIG. 2D is a top perspective view of the example composite fixture of FIGS. 2A-2C prepared for use in a vacuum chamber and autoclave.

FIG. 2C illustrates a top, left perspective exterior view of the example composite fixture 100 with the autoclave bag 202 coupled to the forward edge 104 of the example composite fixture 100 with pieces of tape 206 disposed along the circumference of the forward edge 104. FIG. 2D shows a top perspective view of the example composite fixture 100 prepared for pressurizing in a vacuum chamber with vacuum attachments 208 coupled to the exterior of the example composite fixture 100.

Figure 3:
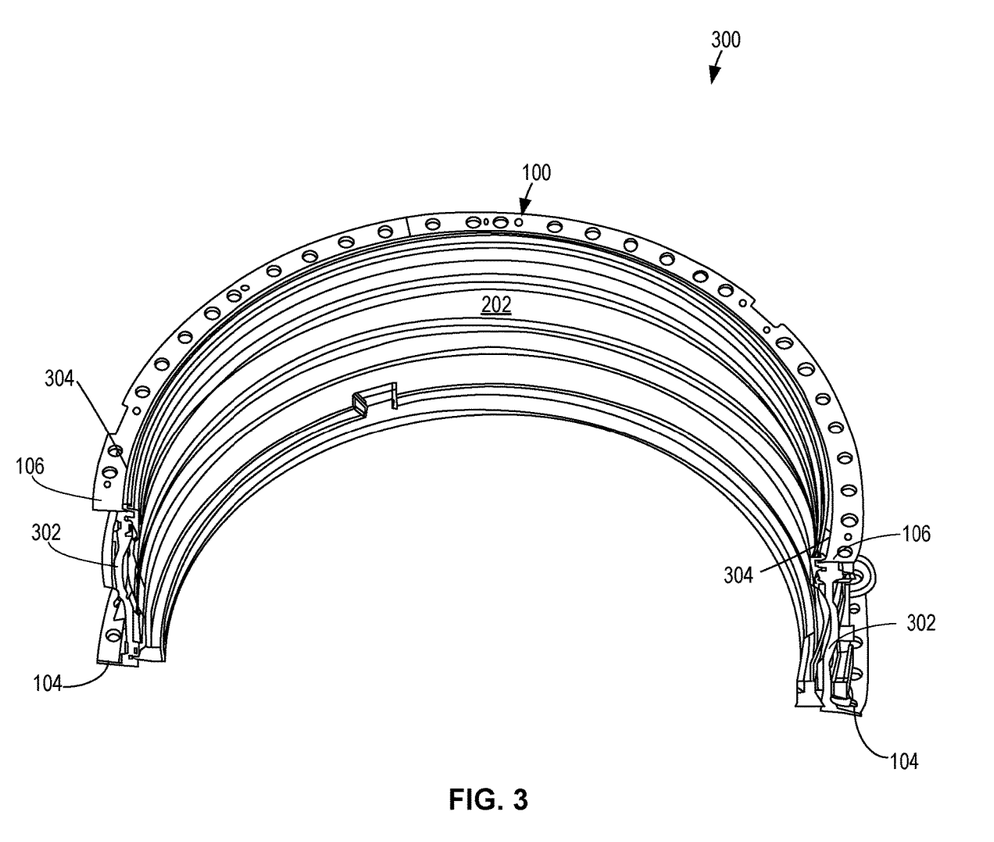
FIG. 3 is an aft cross-sectional view of a half section of the example composite fixture of FIG. 1 including an example flange sealing device.

To remedy the shortcomings of the current manual bagging techniques, FIG. 3 illustrates an example apparatus 300 to secure an autoclave bag 202 to an example composite fixture 100. FIG. 3 shows an aft cross-sectional view of a half section of the example composite fixture 100 of FIG. 1. The example apparatus 300 of FIG. 3 includes a flange sealing device 302 coupled to the example composite fixture 100 at a forward edge 104 and an aft edge 106 of the example composite fixture 100. The example composite fixture 100 includes an aft locating ring 304 disposed along the aft edge 106 of the example composite fixture 100 to position an autoclave bag 202. An example autoclave bag 202 is then placed over plies of composite material or a completed composite material layup 204, and the flange sealing device 302 aligns the autoclave bag 202 with the aft locating ring 304 of the example composite fixture 100. Therefore, the example flange sealing device 302 can form a means to align the autoclave bag 202 to the composite fixture 100. The example flange sealing device 302 secures the autoclave bag 202 at the forward edge 104 and the aft edge 106 of the composite fixture 100.

Figure 4:
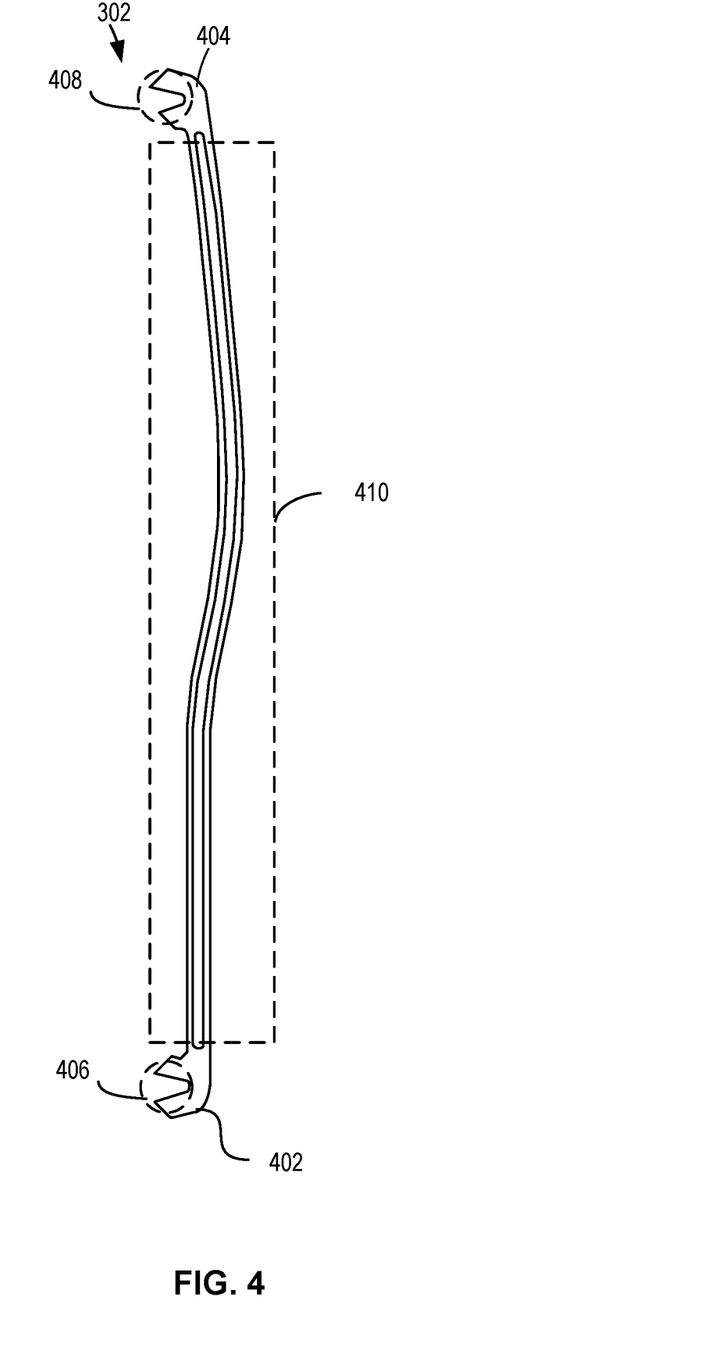
FIG. 4 is a side-view of the example flange sealing device as seen in FIG. 3.

FIG. 4 illustrates a side-view of the example flange sealing device 302 as seen in FIG. 3. The example flange sealing device 302 of FIG. 4 is constructed in accordance with the teachings of this disclosure. The example flange sealing device 302 includes a forward flange 402 at a first end and an aft flange 404 at a second end of the device, the second end opposite the first end. The forward flange 402 positions with a first (forward) end of the autoclave bag 202 with respect the example composite fixture 100 whereas the aft flange 404 positions with a second (aft) end of the autoclave bag 202 with respect to the example composite fixture 100. When the example flange sealing device 302 is placed into the example composite fixture 100, the aft flange 404 meets the aft locating ring 304 of the example composite fixture 100 to align the autoclave bag 202 with the example composite fixture 100.

The forward flange 402 and/or aft flange 404 are each configured with a V-shaped groove 406, 408, respectively, to accept and mate with a surface of another element, such as an autoclave bag 202. In some examples, V-shaped grooves 406 and 408 can be configured in alternate shapes, such as rectangular grooves or semi-circular grooves, etc. In some examples, the dimensions and/or shapes of V-shaped grooves 406 and 408 are different. In other examples, the dimensions and/or shapes of V-shaped grooves 406 and 408 are the same. In some examples, the example flange sealing device 302 is constructed of a rigid material that can withstand a vacuum environment and/or an autoclave environment. In another example, the shaft 410 of the flange sealing device 302 is contoured to conform to a curvature of an interior wall of the example composite fixture 100 in which the curvature can define a surface where the plies of composite material can be placed.

The example flange sealing device 302 of FIG. 4 thus addresses the drawbacks of the manual bagging techniques by providing a reusable and removable mechanism to secure the autoclave bag 202 to the example composite fixture 100. The example flange sealing device 302 can reduce the time and/or number of individuals needed to affix an autoclave bag 202 to an example composite fixture 100 that are required of the current bagging strategies during composite structure manufacturing.

Figure 5:
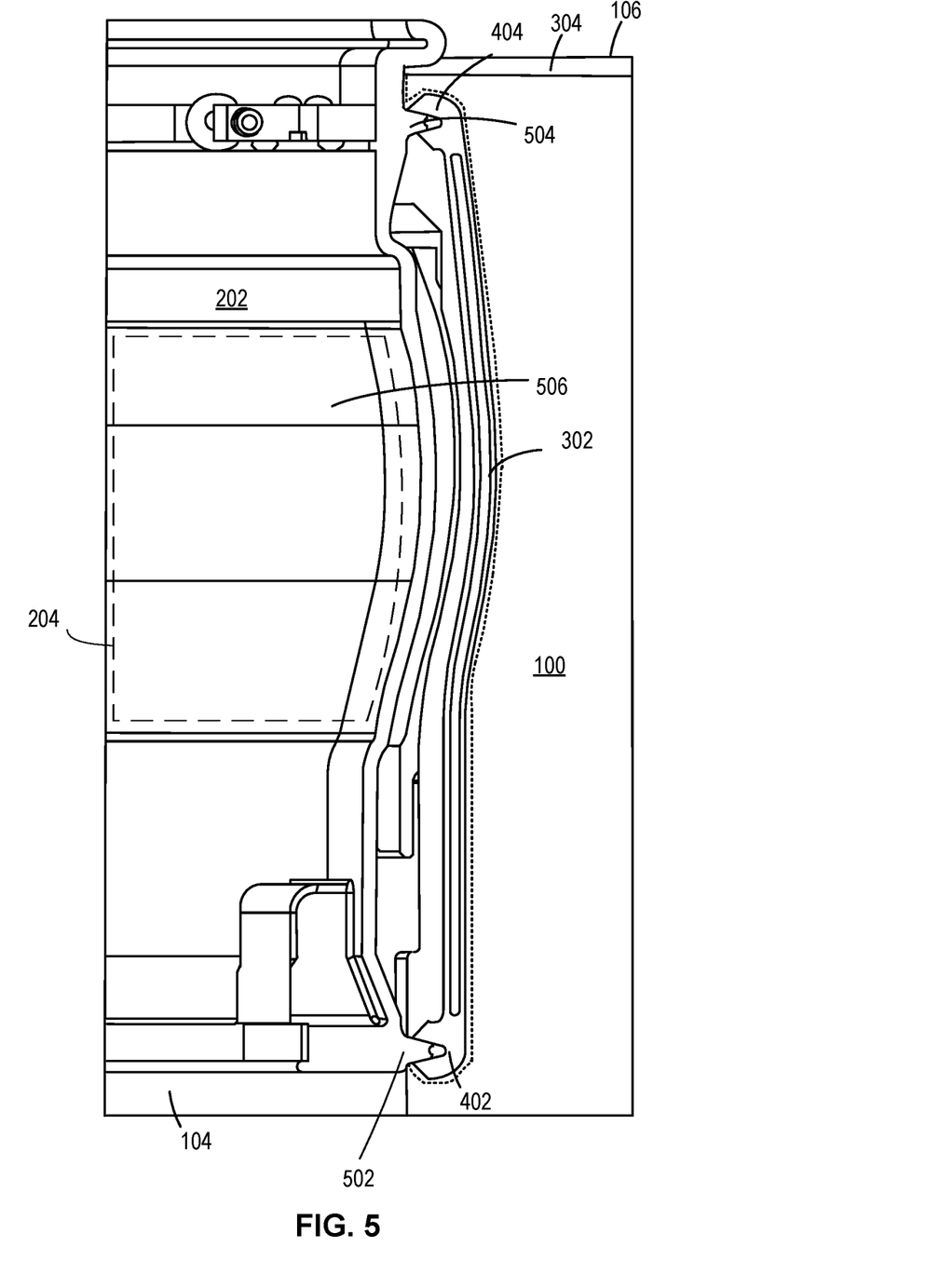
FIG. 5 is an expanded view of the aft cross-sectional view of a half section of the example composite fixture of FIG. 3.

FIG. 5 shows an expanded view of the aft cross-sectional view of a half section of the example composite fixture 100 of FIG. 3. The example composite fixture 100 as seen in FIG. 5 is oriented to show a position of the composite fixture 100 with the autoclave bag 202 when plies of a composite material or a composite material layup 204 lay within the interior surface of the example composite fixture 100 and the placement of the autoclave bag 202 over the composite material layup 204.

As shown in FIG. 5, the example composite fixture 100 of FIG. 3 includes a forward groove 502 to locate the forward flange 402 of the example flange sealing device 302. The forward groove 502 can couple to and seal with the forward flange 402 to secure the flange sealing device 302 to the example composite fixture 100 at the forward edge 104 of the example composite fixture 100. As such, the forward flange 402 can affix an autoclave bag 202 along the forward edge 104 of the example composite fixture 100. In some examples, the example composite fixture 100 does not include a forward groove 502 to locate the forward flange 402 of the example flange sealing device 302. However, the forward flange 402 can still affix an autoclave bag 202 along the forward edge 104 of the example composite fixture 100.

The example composite fixture 100 of FIG. 5 can further include an aft groove 504 to locate the aft flange 404 of the example flange sealing device 302. The aft groove 504 can couple to and seal with the aft flange 404 to secure the flange sealing device 302 to the example composite fixture 100 at the aft edge 106 of the example composite fixture 100. As such, the aft flange 404 can affix the autoclave bag 202 along the aft edge 106 of the example composite fixture 100. In some examples, the composite fixture 100 does not include an aft groove 504 to locate the aft flange 404 of the example flange sealing device 302. However, the aft flange 404 can still affix an autoclave bag 202 along the aft edge 106 of the example composite fixture 100. As such, the example composite fixture 100, can form a means for locating and sealing a flange sealing device 302 to an autoclave bag 202.

In operation, plies of a composite material are placed into the example composite fixture 100 to form a composite material layup 204 to lay within a contour 506 formed in the interior surface of the example composite fixture 100. An autoclave bag 202 then is placed over the composite material layup 204. During placement of the autoclave bag 202 over the composite material layup 204, the aft locating ring 304 disposed along the aft edge 106 of the example composite fixture 100 positions the autoclave bag 202 to align the edge of the autoclave bag 202 to the aft edge 106 of the example composite fixture 100. The example flange sealing device 302 is then placed radially into the interior of the example composite fixture 100 with the V-grooves of the forward flange 402 and aft flange 404 oriented to face the interior surface of the example composite fixture 100 to make contact with the autoclave bag 202.

The aft flange 404 of the example flange sealing device 302 mates with an aft edge of the autoclave bag 202 to facilitate a seal between the autoclave bag 202 and the example composite fixture 100 along the circumference of the aft edge 106 of the example composite fixture 100, for example. The forward flange 402 of the example flange sealing device 302 mates with a forward edge of the autoclave bag 202 to facilitate a seal between the autoclave bag 202 to the example composite fixture 100 along the circumference of the forward edge 104 of the example composite fixture 100, for example.

Figure 6:
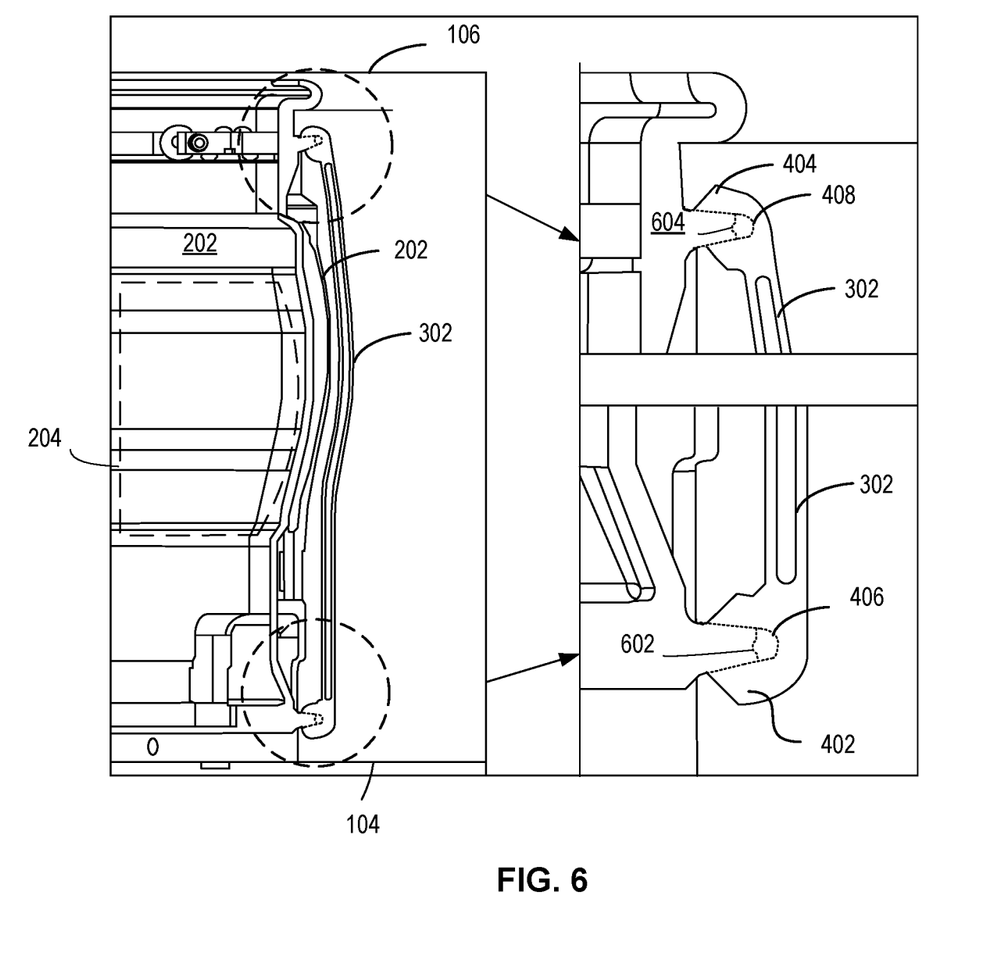
FIG. 6 is an expanded view of the forward flange and aft flange of the flange sealing device as seen in FIG. 5.

FIG. 6 illustrates an expanded view of the forward flange 402 and aft flange 404 of the example flange sealing device 302 as seen in FIG. 5. The V-shaped grooves 406, 408 of the forward flange 402 and the aft flange 404, respectively, of the example flange sealing device 302 can accept a portion of the autoclave bag 202 to facilitate a seal between the autoclave bag 202 and the forward flange 402 and aft flange 404 of the example flange sealing device 302. When a portion of the autoclave bag 202 is accepted by the V-shaped grooves 406, 408 of the forward flange 402 and aft flange 404, respectively, the accepted portion of the autoclave bag 202 can form a forward dimple 602 inside of the V-shaped groove 406 of the forward flange 402 and an aft dimple 604 inside of the V-shaped groove 408 of the aft flange 404 of the example flange sealing device 302. In some examples, the forward dimple 602 and the aft dimple 604 have the same dimensions. In other examples, the forward dimple 602 and the aft dimple 604 have different dimensions.

The forward dimple 602 of the autoclave bag 202 facilitates the seal with the forward flange 402 of the example flange sealing device 302 while the aft dimple 604 of the autoclave bag 202 facilitates the seal with the aft flange 404 of the example flange sealing device 302. Formation of the forward dimple 602 and aft dimple 604 can reduce constraints on the vacuum applied to the autoclave bag 202 when the example composite fixture 100 is placed into a vacuum environment and reduce the chances for vacuum leakage in the autoclave bag 202.

In the example disclosed in FIG. 6, the seal at the forward edge 104 and the aft edge 106 of the example composite fixture 100 between the autoclave bag 202 and the example composite fixture 100 runs radially across the whole circumference of the example composite fixture 100 and/or axially across the surface of the example composite fixture 100. Thus, the flange sealing device 302 can form a means for facilitating a vacuum seal of an autoclave bag 202, in both axial and radial directions, across the circumference of a composite fixture 100. The resulting bi-directional seal that is achieved with the use of the example flange sealing device 302 to secure an autoclave bag 202 to the example composite fixture 100 over a composite material layup 204 addresses the shortcomings of manual bagging techniques previously presented by reducing the chances of vacuum leakage during the application of a vacuum to the example composite fixture 100 to pressurize and debulk the composite material layup 204. Thus, the use of the example flange sealing device 302 can reduce weakening of a final composite structure, or damage to the final composite structure.

Figure 7:
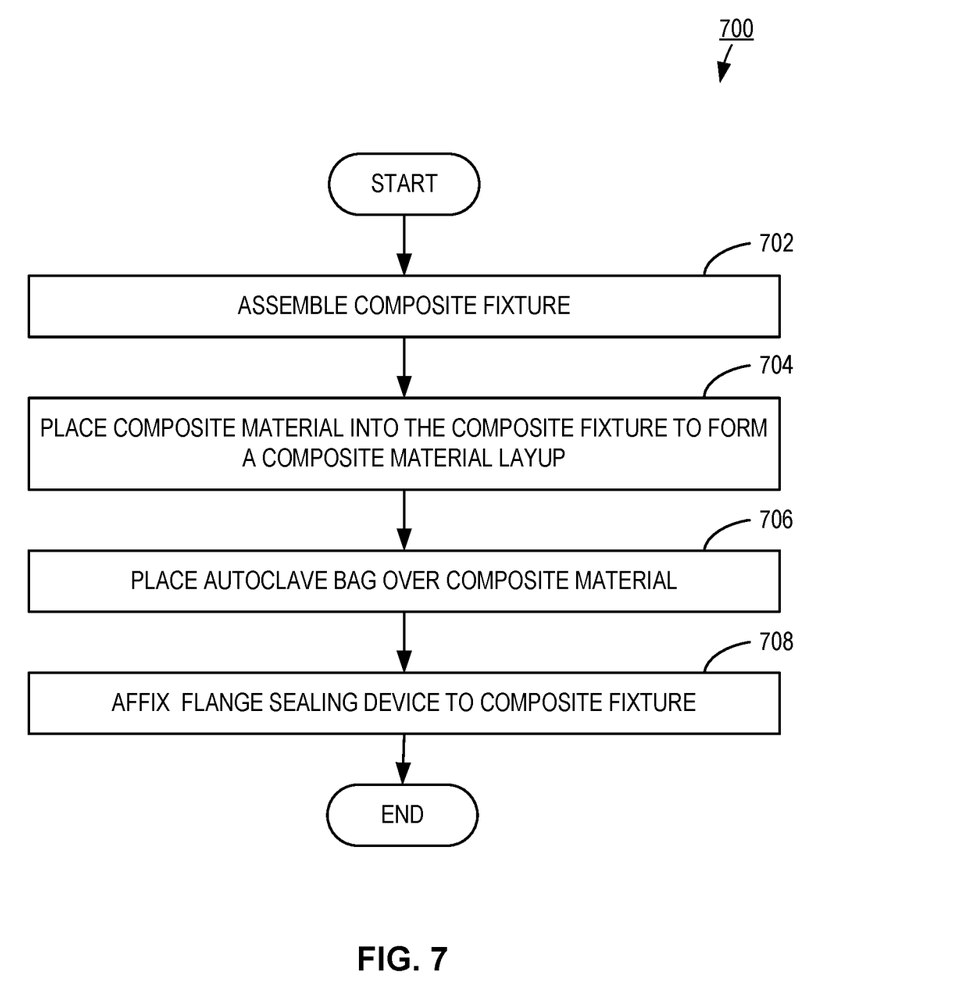
FIG. 7 is a flowchart representative of a method to prepare an example composite structure for use to construct a composite structure.

A flowchart representative of an example method for preparing a composite fixture for use to produce a composite structure is shown in FIG. 7. Although the example method is described with reference to the flowchart illustrated in FIG. 7, many other methods can alternatively be used. For example, some of the blocks described herein can be changed, eliminated, or combined.

The example method 700 of FIG. 7 begins by assembling the example composite fixture (block 702). In some examples, the example composite fixture 100 can include two semi-circular halves, whereas in other examples, the example composite fixture 100 can include more than two sections, that, when put together, form a cylindrical shape of the example composite fixture 100. As such, the example method 700 includes assembling the individual sections of the composite fixture 100 into a full composite fixture (block 702). In some examples, a separate apparatus not disclosed herein, can automatically assemble the sections of the example composite fixture 100 together. In some examples, the sections of the example composite fixture 100, having a cylindrical shape, can be secured together with bolts. In other examples, the sections of the example composite fixture 100 can be secured with other tools for example, a threaded adjuster(s), a bolt fastener(s) or clip(s). In operation, the example composite fixture 100 is assembled once during preparation of the example composite fixture 100 to enable the placement of composite material layup 204 and the autoclave bag 202.

The example method 700 of FIG. 7 also includes placing individual plies of composite material into the assembled example composite fixture 100 to form a composite material layup 204 of a desired thickness (block 704). In some examples, a separate apparatus containing composite materials not disclosed herein, can automatically add individual plies of composite material to the example composite fixture 100. Once a composite material layup is completed, an autoclave bag 202 is then placed over the composite material layup 204 (block 706) where the aft end of the autoclave bag 202 meets the aft locating ring 304 of the example composite structure 100. In some examples, the example composite fixture 100 can be placed into a separate machine not disclosed herein that can place the autoclave bag 202 over the composite material layup 204.

After placement of the autoclave bag 202 over the composite material layup 204, the example method 700 includes affixing the example flange sealing device 302 to the composite fixture (block 708). When the example flange sealing device 302 is affixed to the example composite fixture, the autoclave bag 202 is secured to the example composite fixture 100 at the aft end and forward end.

After the example method 700 of FIG. 7 is complete, the example composite fixture 100 is prepared for use to produce a composite structure in the shape of the example composite fixture 100.

Figure 8:
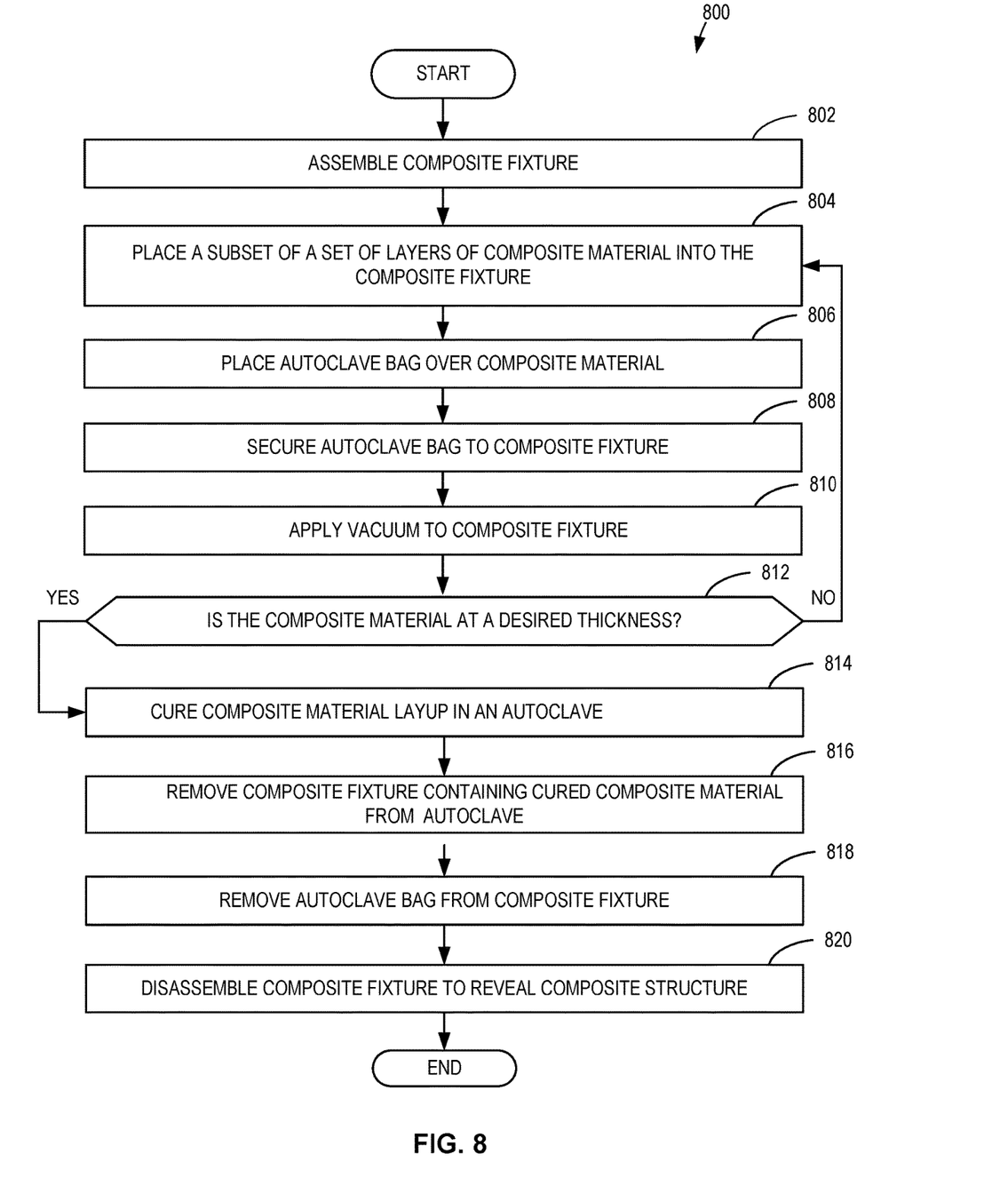
FIG. 8 is a flowchart representative of a method to secure an autoclave bag to a composite fixture with an example flange sealing device to produce a composite structure.

A flowchart representative of an example method 800 for using the example flange sealing device 302 with the example composite fixture 100 to produce a composite structure is shown in FIG. 8. The example method 800 of FIG. 8 is a more specific method of method 700 of FIG. 7 that results in a completed composite structure ready for use or for further processing. Although the example method 800 is described with reference to the flowchart illustrated in FIG. 8, many other methods can alternatively be used. For example, some of the blocks described herein can be changed, eliminated, or combined.

The example method 800 of FIG. 8 begins with assembling the example composite fixture 100 by arranging section(s) of the example composite fixture 100 together and securing the section(s) together to form an assembled example composite fixture (block 802). The example method 800 then proceeds to placing a subset of a total set of layers of composite material into the example composite fixture 100 to form a composite material layup 204 (block 804). For example, if the total set of layers of the final composite material is determined to be 100, a subset of those 100 layers, for example 10 layers, are individually placed into the composite fixture. In some examples, the process of block 804 can be done automatically by a separate apparatus not disclosed herein.

The example method 800 of FIG. 8 further includes placing an autoclave bag 202 over the composite material layup 204 (block 806). During placement of the autoclave bag 202 over the composite material layup 204, the aft end of the autoclave bag 202 is guided to meet the aft locating ring 304 of the example composite fixture 100. In some examples, a separate machine not disclosed herein can automate the placement of the autoclave bag 202 over the composite material layup 204. Method 800 then involves securing the autoclave bag 202 to the example composite fixture 100 by dropping in the example flange sealing device 302 into the example composite fixture 100 (block 808). When the example flange sealing device 302 is dropped into the example composite fixture 100, the forward flange 402 of the example flange sealing device 302 locates to the forward groove 502 of the example composite fixture 100 to affix the autoclave bag 202 at the forward end. As such, the aft flange 404 of the example flange sealing device 302 locates to the aft groove 504 of the example composite fixture 100 to affix the autoclave bag 202 at the aft end. After the autoclave bag 202 is secured to the example composite fixture 100, method 800 then includes applying a vacuum to the example composite fixture 100 (block 810). In some example, the process of block 810 is done by a vacuum chamber or other device that can apply a vacuum seal to the example composite fixture 100.

Following the application of a vacuum seal to the example composite fixture 100 in block 810, the example method 800 of FIG. 8 further includes determining whether the composite material layup 204 is at a desired thickness (block 812). If it is determined that additional layers of composite material are required to attain the desired thickness of the final composite material, the example method 800 returns to block 804 to continue placement of a subset of the total set of layers of the composite material into the example composite fixture 100. Method 800 then proceeds to blocks 806, 808, and 810 and repeats until a desired thickness of the composite material layup 204 is achieved. For example, if a final composite material is to have a desired thickness of 100 layers of composite material, and a subset of layers consists of 10 individual layers, blocks 804, 806, 808 and are repeated 10 times with each repetition to add an additional 10 layers of composite material to the composite material layup 204 in the example composite fixture 100.

Once a desired thickness of the composite material layup 204 is achieved, the example method 800 of FIG. 8 proceeds to curing the final composite material layup in an autoclave (block 814). After curing the final composite material, the example method 800 further includes removing the example composite fixture 100 containing the cured composite material from the autoclave (block 816). Method 800 then involves removing the autoclave bag 202 from the example composite fixture 100 (block 818) by decoupling the autoclave bag 202 from the forward flange 402 and the aft flange 404 of the example flange sealing device 302. The example method 800 can end with disassembling the example composite fixture 100 containing the cured composite material into its constituent sections (block 820) to reveal a completed composite structure. In some examples, the disassembling can be completed by an automatic apparatus not disclosed herein.

After method 800 of FIG. 8 is complete, the resulting example composite structure of method 800 of FIG. 8 can have the cylindrical, open-ended shape of the example composite fixture 100. This cylindrical, open-ended composite structure can be used in engines, specifically aircraft engines, or can have other non-limiting applications or uses such as an outer combustor liner, an inner combustor liner, a shroud, for example a ring-shaped shroud, a fan case, a pressure vessel or an exhaust duct.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Further aspects of the invention are provided by the subject matter of the following clauses:

1. An apparatus comprising: a flange sealing device including: a forward flange at a first end; and an aft flange at a second end; a composite fixture including: a forward groove to locate and seal with the forward flange of the flange sealing device to affix an autoclave bag; an aft groove to locate and seal with the aft flange of the flange sealing device to affix the autoclave bag; and an aft locating ring to position the autoclave bag.

2. The apparatus of any preceding clause, wherein the autoclave bag further includes a forward dimple to facilitate the seal with the forward flange of the flange sealing device and an aft dimple to facilitate the seal with the aft flange of the flange sealing device.

3. The apparatus of any preceding clause, wherein the flange sealing device facilitates a vacuum seal of the autoclave bag in both axial and radial directions across the circumference of the composite fixture.

4. The apparatus of any preceding clause, wherein the aft locating ring is to align the autoclave bag to the composite fixture, the flange sealing device secured to the composite fixture.

5. The apparatus of any preceding clause, wherein the composite fixture is to accept a first subset of layers of composite material for pressurizing.

6. The apparatus of any preceding clause, wherein the composite fixture is to facilitate pressurizing of a second subset of layers of the composite after the pressurizing of the first subset of layers of the composite material.

7. The apparatus any preceding clause, wherein the composite fixture is to accept a set of layers of composite material for autoclaving to output a composite structure.

8. The apparatus of any preceding clause, wherein the composite structure is a cylindrical engine part.

9. The apparatus of any preceding clause, wherein the autoclave bag is secured in the composite fixture using the flange sealing device to withstand a pressurizing environment and an autoclaving environment.

10. The apparatus of any preceding clause, wherein the flange sealing device further includes a shaft, the shaft contoured to conform to a shape of an interior surface of the composite fixture.

11. An apparatus comprising: a flange sealing device including: a forward flange at a first end, the forward flange to position and seal a first end of an autoclave bag with respect to a fixture; and an aft flange opposite the forward flange at a second end, the aft flange to position and seal a second end of the autoclave bag with respect to the fixture.

12. The apparatus of any preceding clause, wherein the flange sealing device is to meet an aft locating ring on a composite fixture to align an autoclave bag with the composite fixture.

13. The apparatus of any preceding clause, wherein the alignment of the autoclave bag with the composite fixture is performed each time the flange sealing device is affixed to the composite fixture.

14. The apparatus of any preceding clause, wherein the forward flange locates a forward groove in the composite fixture and the aft flange locates an aft groove in the composite fixture to secure the flange sealing device to the composite fixture.

15. The apparatus of any preceding clause, wherein the flange sealing device facilitates a vacuum seal of the autoclave bag in both axial and radial directions across the circumference of the composite fixture.

16. The apparatus of any preceding clause, wherein the flange sealing device further includes a shaft, the shaft contoured to conform to a shape of an interior surface of the composite fixture and mate with the interior surface of the composite fixture.

17. An apparatus comprising: means for facilitating a vacuum seal of an autoclave bag in both axial and radial directions across the circumference of a composite fixture; and means for locating and sealing a flange sealing device to an autoclave bag.

18. The apparatus of any preceding clause, wherein the means for facilitating a vacuum seal of the autoclave bag further aligns the autoclave bag to the composite fixture.

19. The apparatus of any preceding clause, wherein the means for locating and sealing further accepts layers of composite material for pressurizing and autoclaving to output a composite structure.

20. The apparatus of any preceding clause, wherein the composite structure is a cylindrical engine part.

What is claimed is:

1. An apparatus comprising:
a detachable flange sealing device including:
a forward flange including a first indented groove at a first end; and
an aft flange including a second indented groove at a second end; and
a composite fixture including:
a forward groove in a first protrusion from an exterior surface of the composite fixture at a forward end, wherein, when the detachable flange sealing device is positioned on the composite fixture, the forward groove is to locate and seal with the forward flange of the detachable flange sealing device to affix an autoclave bag;
an aft groove in a second protrusion from the exterior surface of the composite fixture at an aft end, wherein, when the detachable flange sealing device is positioned on the composite fixture, the aft groove is to locate and seal with the aft flange of the detachable flange sealing device to affix the autoclave bag; and
an aft locating ring located on an aft edge of the composite fixture to position the autoclave bag.

2. The apparatus of claim 1, wherein the autoclave bag further includes a forward dimple to facilitate the seal with the forward flange of the detachable flange sealing device and an aft dimple to facilitate the seal with the aft flange of the detachable flange sealing device.

3. The apparatus of claim 1, wherein the detachable flange sealing device facilitates a vacuum seal of the autoclave bag in both the axial and radial directions across the circumference of the composite fixture.

4. The apparatus of claim 1, wherein the aft locating ring is to align the autoclave bag to the composite fixture, the detachable flange sealing device secured to the composite fixture.

5. The apparatus of claim 1, wherein the composite fixture is to accept a first subset of layers of composite material for pressurizing.

6. The apparatus of claim 5, wherein the composite fixture is to facilitate pressurizing of a second subset of layers of the composite material after the pressurizing of the first subset of layers of the composite material.

7. The apparatus of claim 1, wherein the composite fixture is to accept a set of layers of composite material for autoclaving to output a composite structure.

8. The apparatus of claim 1, wherein the composite fixture is a cylindrical engine part.

9. The apparatus of claim 1, wherein the autoclave bag is secured in the composite fixture using the detachable flange sealing device to withstand a pressurizing environment and an autoclaving environment.

10. The apparatus of claim 1, wherein the detachable flange sealing device further includes a shaft, the shaft contoured to conform to a shape of an interior surface of the composite fixture.

* * * * *